United States Patent
Burns

(10) Patent No.: US 10,970,285 B2
(45) Date of Patent: Apr. 6, 2021

(54) GRID TOPOLOGY CHANGE IN A DISTRIBUTED DATA GRID WHEN ITERATING ON THE CONTENTS OF THE DATA GRID

(71) Applicant: Red Hat, Inc., Raleigh, NC (US)

(72) Inventor: William Rosenquist Burns, Annapolis, MD (US)

(73) Assignee: Red Hat, Inc., Raleigh, NC (US)

(*) Notice: Subject to any disclaimer, the term of this patent is extended or adjusted under 35 U.S.C. 154(b) by 474 days.

(21) Appl. No.: 14/633,031

(22) Filed: Feb. 26, 2015

(65) Prior Publication Data

US 2016/0253386 A1    Sep. 1, 2016

(51) Int. Cl.
G06F 16/2455    (2019.01)
H04L 29/08    (2006.01)
G06F 16/957    (2019.01)

(52) U.S. Cl.
CPC ...... G06F 16/2455 (2019.01); G06F 16/9577 (2019.01); H04L 67/1097 (2013.01); H04L 67/125 (2013.01); H04L 67/18 (2013.01); H04L 67/2823 (2013.01)

(58) Field of Classification Search
USPC .......................................................... 707/758
See application file for complete search history.

(56) References Cited

U.S. PATENT DOCUMENTS

| | | | |
|---|---|---|---|
| 8,230,070 B2 | 7/2012 | Buyya et al. | |
| 8,539,197 B1 * | 9/2013 | Marshall | G06F 13/00 711/112 |
| 8,719,307 B2 | 5/2014 | Surtani et al. | |
| 9,047,307 B1 * | 6/2015 | Ghemawat | H04L 67/1095 |
| 9,342,849 B2 * | 5/2016 | Hu | G06Q 30/0635 |
| 9,396,202 B1 * | 7/2016 | Drobychev | G06F 16/1744 |
| 9,619,545 B2 * | 4/2017 | Hardy | G06F 17/30578 |

(Continued)

OTHER PUBLICATIONS

Ivanov, N. "Pearls of Distributed Programming at Philly's Scala Meetup", http://gridgaintech.wordpress.com/page/3/, 22 pages, Apr. 15, 2013, retrieved Nov. 18, 2014.

(Continued)

*Primary Examiner* — Tamara T Kyle
*Assistant Examiner* — Raheem Hoffler
(74) *Attorney, Agent, or Firm* — Lowenstein Sandler LLP

(57) ABSTRACT

A method of communicating data in a data grid. The method includes receiving a first search request defined by search criteria of a search query. The method includes communicating the first search request to search for data segments at the first node that match the search criteria. The method includes receiving one or more data segments matching the search criteria. The method includes receiving rebalance information. The method further includes identifying a second node storing rebalance data segments of the plurality of rebalance data segments based on the rebalance information. The method further includes communicating a second search request to search for the rebalance data segments matching the search criteria. The method further includes receiving one or more rebalance data segments matching the search criteria. The method further includes determining search result data using the data segments from the first node and the rebalance data segments from the second node.

20 Claims, 5 Drawing Sheets

(56) References Cited

U.S. PATENT DOCUMENTS

| | | | | |
|---|---|---|---|---|
| 9,652,277 | B2* | 5/2017 | Broustis | G06F 9/45558 |
| 9,773,042 | B1* | 9/2017 | Li | G06F 16/21 |
| 9,824,119 | B2* | 11/2017 | Sah | G06F 16/2453 |
| 9,916,100 | B2* | 3/2018 | Wang | G06F 16/178 |
| 10,235,460 | B2* | 3/2019 | Ago | G06F 16/951 |
| 2002/0078174 | A1* | 6/2002 | Sim | G06F 16/182 |
| | | | | 709/219 |
| 2003/0126200 | A1* | 7/2003 | Wolff | G06F 9/52 |
| | | | | 709/203 |
| 2006/0248045 | A1* | 11/2006 | Toledano | G06F 17/30463 |
| 2007/0156842 | A1* | 7/2007 | Vermeulen | G06F 17/30212 |
| | | | | 709/217 |
| 2008/0221856 | A1* | 9/2008 | Dubnicki | G06F 3/067 |
| | | | | 703/21 |
| 2010/0235409 | A1* | 9/2010 | Roy | G06F 16/1827 |
| | | | | 707/812 |
| 2012/0158805 | A1 | 6/2012 | Andre et al. | |
| 2012/0197822 | A1 | 8/2012 | Lee et al. | |
| 2013/0041969 | A1 | 2/2013 | Falco et al. | |
| 2013/0066955 | A1* | 3/2013 | Neel | G06F 11/1443 |
| | | | | 709/203 |
| 2013/0318314 | A1 | 11/2013 | Markus et al. | |
| 2014/0201129 | A1* | 7/2014 | Gupta | G06F 16/254 |
| | | | | 707/602 |
| 2014/0201155 | A1* | 7/2014 | Vijayan | G06F 11/1448 |
| | | | | 707/647 |
| 2015/0227586 | A1* | 8/2015 | Li | G06F 9/5027 |
| | | | | 707/769 |
| 2016/0154847 | A1* | 6/2016 | Prasanna Kumar | G06F 17/30463 |
| | | | | 707/718 |
| 2017/0077950 | A1* | 3/2017 | Pavlov | H03M 13/611 |

OTHER PUBLICATIONS

Kirby, T. et al. "IBM WebSphere eXtreme Scale V7: Solutions Architecture", http://www.redbooks.ibm.com/redpapers/pdfs/redp4602.pdf, 98 pages, Dec. 2009.

Ruzzi, J. "Oracle® Coherence Getting Started Guide Release 3.7", https://docs.oracle.com/cd/E18686_01/coh.37/e18680.pdf, Apr. 2011, 118 pages.

Setrakyan, D., "GridGain—In Memory Data Fabric", http://gridgain.blogspot.in/2012_11_01_archive.html, Nov. 2012, 9 pages, retrieved Nov. 18, 2014.

Infinispan "Iterate All the Entries in the Cache", http://blog.infinispan.org/2014/05/iterate-all-entries-in-cache.html, 4 pages, Tuesday May 27, 2014, updated Oct. 31, 2014, retrived on Aug. 18, 2017.

Infinispan "Add Support for Distributed Entry Iterator" https://github.com/infinispan/infinispan/commit/220e3cc066f18a153c003e112b3587f376199bf9, GitHub, Inc., 62 pages, 2017, retrived on Aug. 18, 2017.

Surtani, M., et al., "Infinispan 7.0 User Guide" http://ininispan.org/docs/7.0/x/user_guide/user_guide.html#_entry_retrieval, Jul. 5, 2016, 213 pages.

* cited by examiner

GRID TOPOLOGY CHANGE IN A DISTRIBUTED DATA GRID WHEN ITERATING ON THE CONTENTS OF THE DATA GRID

The present disclosure pertains to computer systems; more specifically, to changes of topology in a data grid.

BACKGROUND

Data, such as software programs, information, or other forms of data, has become a resource and asset for many individuals and businesses. A data grid is a distributed database system with increased computing power and storage capacity that can store and manage data across a collection of nodes. Data grids can provide functionalities such as storing, searching, and processing data. As individuals and businesses continue to store, search, and process increasing amounts of data, a size of a data grid may be adjusted as data usage by the businesses and individuals varies.

Traditionally, when performing functionalities such as storing, searching, and processing data, a map/reduce application may be used. The map/reduce application can provide distributed processing for large data sets in a data grid. The map/reduce application can include two phases, a map phase and a reduce phase. In the map phase, a master node can initiate a task such as a query, and divide or map tasks between multiple nodes in the data grid. The nodes that receive the map tasks can execute the map tasks and return results back to the master node. When the master node receives the data, the master node can implement a reduce phase. In the reduce phase, the master node can aggregate the received data and remove duplicate data, e.g., reduce the data results. When the master node has completed the reduce phase, the master node can communicate the reduced data to the querying application.

While the map/reduce application can be used to query data in a data grid, the adjustability of the data grid can be limited. For example, a data grid using the map/reduce application for querying data cannot adjust or adapt to topology changes in the data grid, such as node crashes, nodes joining or leaving the data grid, or balancing of data between the nodes.

DESCRIPTION OF EMBODIMENTS

Figure 1:
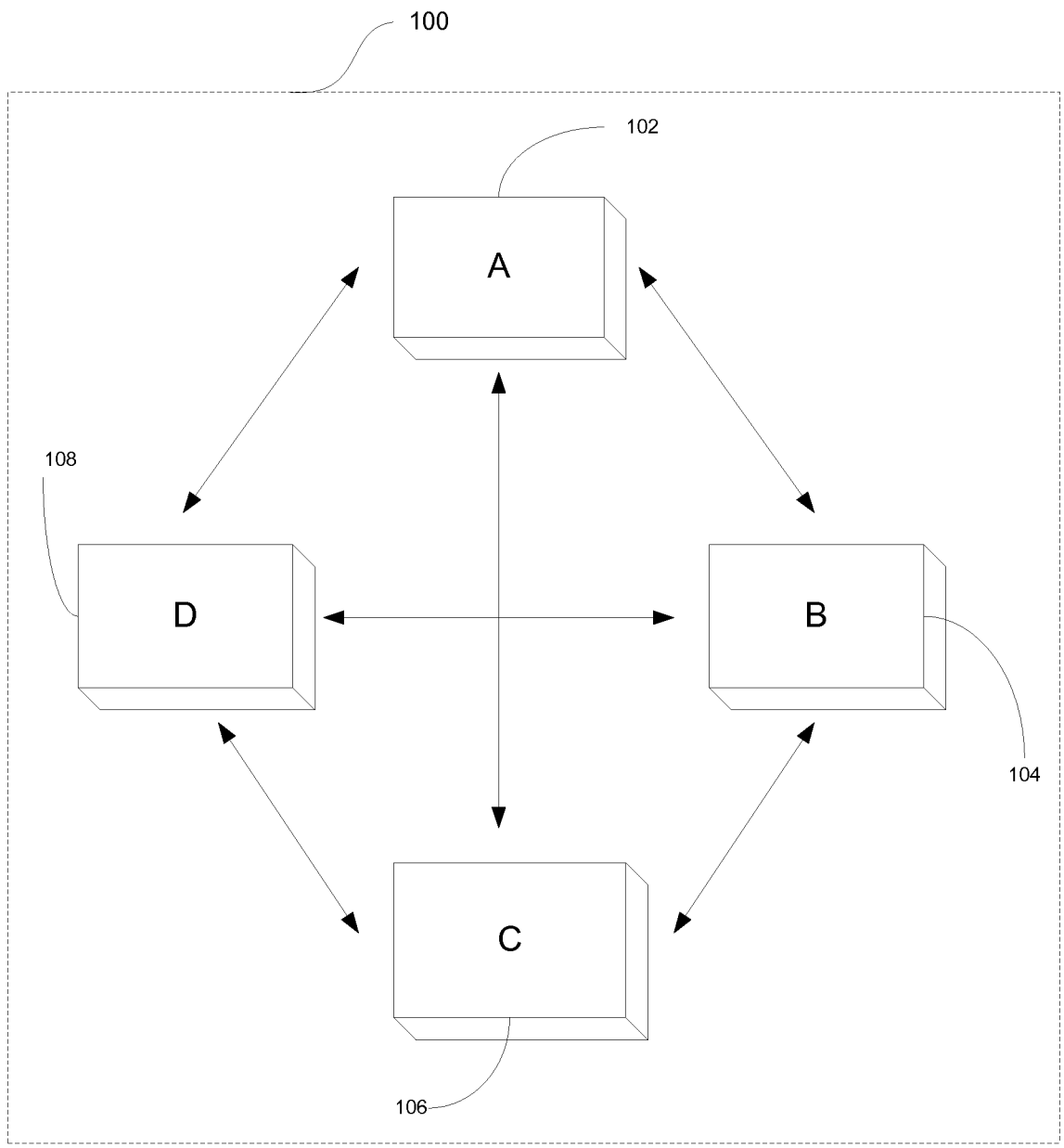
FIG. 1 illustrates a block diagram of nodes in a data grid according to one embodiment.

Data transfer technologies are described herein.

Data grids can manage distributed data, where the data can be stored across multiple locations and multiple types of storage devices. The data grid can be a collection of nodes, where the nodes can be physical machines, virtual machines, computers, servers, collections of physical machines or virtual machines, and so forth. The nodes can include memories, such as a cache, for storing data.

When a user desires to access data in the data grid, an application can query data stored in the data grid using an iteration process, where the data stored at the nodes in the data grid can be iterated through during the query. As an amount of data in the data grid varies with varying data usage by individuals or businesses, topology changes in the data grid (such as an addition of nodes, removal of nodes, or rebalancing of data in the data grid) can occur. Traditionally, when data is being processed, added, removed, modified, searched, and so forth in a data grid during a query process such as a map/reduce process, a topology change can be difficult. For example, traditionally when the topology of the data grid changes during a query, a master node in the data grid, using a map/reduce process, receives search result data from nodes in the data grid. Because of the topology changes, the master node may be unaware when data may have been added to, removed from, or modified at a node during the query.

In one example, traditionally when a cache entry occurs at a node during an iteration process, the cache entry can be overlooked or sent to the querying application out of order. When data is overlooked, the querying application may not receive an up-to-date data set from the data grid to analyze and/or provide results to a user. Additionally, when data is sent to the querying application out of order, the querying application may erroneously analyze the out of order data and/or report incorrect information to a user. In another example, when the memories of the current nodes in the data grid reach full capacity, a new node may need to be added to the data grid. However, traditionally when the query is being performed, the new node cannot be added until the query is completed. The delay in adding the new node to the data grid during the query can be problematic, as data modifications (such as data writes) can occur during the query and when the memory of the data grid is at full capacity there may be no place to write the new data.

Aspects of the present disclosure address the above noted deficiencies by enabling a topology change of nodes and data rebalancing during an iteration process of a query search. The topology of the nodes can be changed and data can be rebalanced between the nodes to provide a data grid with variable memory capacity and increased data locality. Additionally, rebalance information can be used to track data rebalancing during the iteration process to enable the querying application to receive up-to-date results. An advantage of a variable memory capacity can be to enable addition of nodes to the data grid as the memory capacity of the data grid reaches its limit and a release of nodes from the data grid when the nodes are not being used. An advantage of increased data locality in the data grid can be to increase a speed and efficiency of data accesses and data searches in the data grid.

FIG. 1 illustrates a block diagram of nodes 102, 104, 106, and 108 in a distributed data grid 100. The nodes 102, 104, 106, and 108 can include memories, such as caches, for storing data. The nodes 102, 104, 106, and 108 can communicate with the other nodes 102, 104, 106, and 108, respectively, in the data grid 100. In one example, the nodes 102, 104, 106, and 108 can communicate data to the other nodes 102, 104, 106, and 108, respectively, to backup data in the data grid 100. In another example, the nodes 102, 104, 106, and 108 can communicate data to the other nodes 102, 104, 106, and 108, respectively, to rebalance the data in the data grid 100.

A memory at a node can include multiple memory entries, where each memory entry includes a key and a value, i.e. a (key, value) pair. The (key, value) pair can include an identification (ID) value (the key) that is associated with data (the value). For example, the (key, value) pair can be an ID value associated with information about a person, e.g., (ID, Person). The (key, value) pair can be used to perform different functions at nodes in a data grid, such as data reads, data writes, data deletions, and the transferring of data between nodes.

Figure 2:
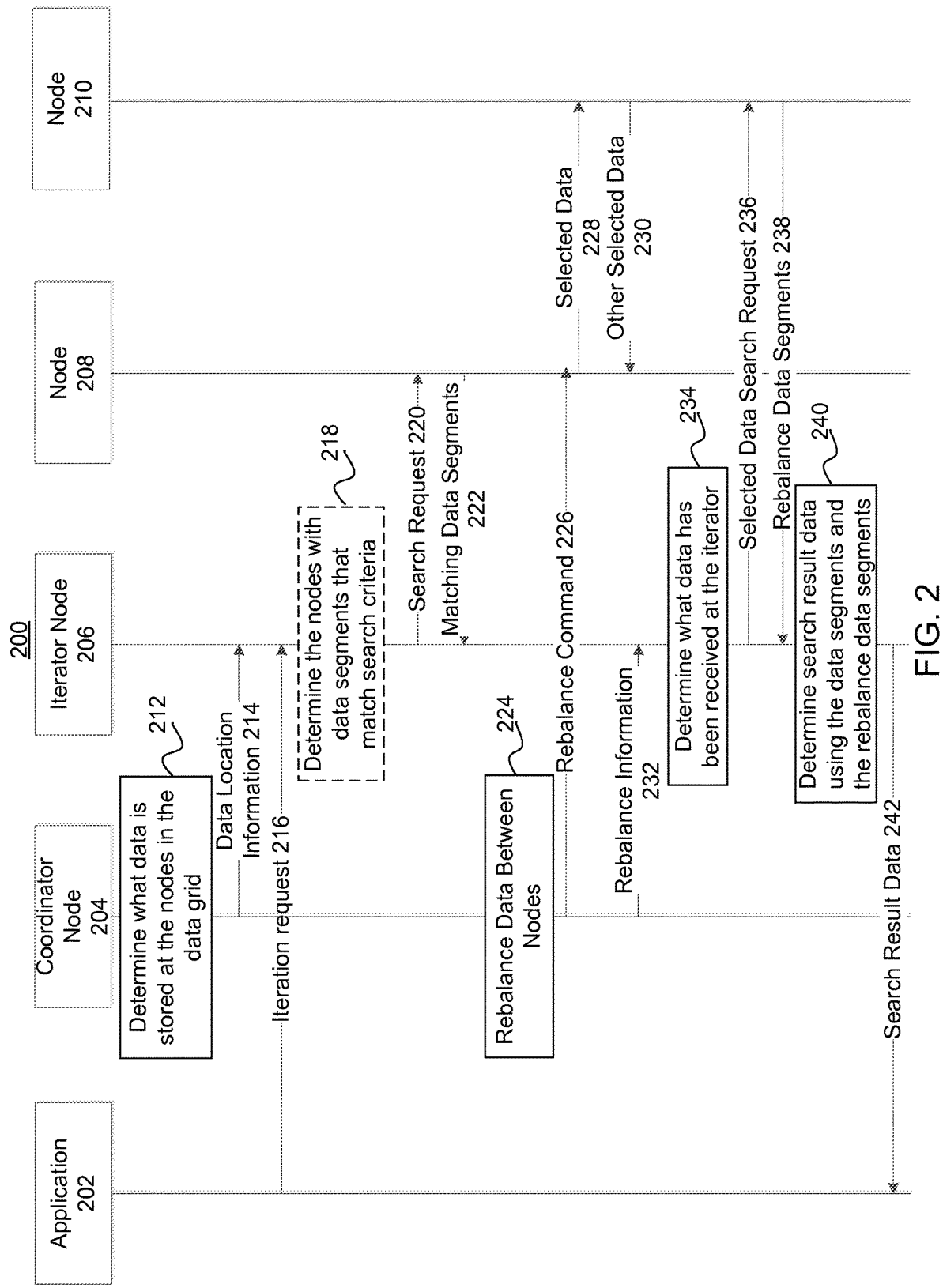
FIG. 2 depicts a sequence diagram of a method of performing a query in a data grid when data is rebalanced within a data grid according to one embodiment.

FIG. 2 depicts a sequence diagram of a method 200 of performing a query in a data grid when data is rebalanced within a data grid. Method 200 may be performed by a processing logic that may comprise hardware (e.g., circuitry, dedicated logic, programmable logic, microcode, etc.), software (such as operations being performed by the MCU), firmware or a combination thereof. In one example, method 200 is performed by a processor, a plurality of processors, a processor core, and/or a plurality of processor cores. Alternatively, other components of a computing system or software executing on the processor may perform some or all of the operations of the method 200.

Referring to FIG. 2, the method 200 can begin by a coordinator at a coordinator node 204 determining what data is stored at the nodes 206, 208, and 210 in the data grid (step 212). The coordinator can be an application installed or registered at the coordinator node 204 that coordinates topology changes in the data grid. In one example, when the nodes in the data grid may initially be empty, the coordinator can direct which node or nodes may receive data and can maintain a list of keys of the key value pairs identifying the location of the data in the data grid. In this example, the coordinator can use the list of keys to determine what data is stored at the nodes 206, 208, and 210. For example, the coordinator can maintain a list of keys indicating that demographic information is stored at nodes 206 and 208, where nodes 206 and 208 store key value pairs of the demographic information. In another example, the coordinator can communicate with the nodes 206, 208, and 210 to request the keys and maintain the list of keys used to determine what data is stored at the nodes 206, 208, and 210.

When the coordinator node 204 determines what data is stored at the nodes 206, 208, and 210, the coordinator can communicate, to an iterator of the iterator node 206, data location information indicating what data is stored at the nodes 206, 208, and 210 (step 214). In one example, the iterator can store the location information in a memory coupled to the iterator. An application 202 can send, to the iterator of the iterator node, an iteration request initiating an iteration process, where the iteration request defines search criteria of a search query (step 216). In one example, the application 202 can be a web application that sends an iteration request to the iterator. In another example, the application 202 can be a remote client that sends the iteration request.

The iterator can determine which nodes in the data grid include data segments that match the search criteria using the data location information received from the coordinator (step 218). In one example, the search criteria can be for demographic information and the iterator can use the data location information to determine that a memory of the node 208 contains data segments for demographic information that may match the search criteria. When the iterator has determined that node 208 contains data segments that match the search criteria, the iterator can send a search request to the node 208 requesting the data segments that match the search criteria (step 220). As the node 208 searches the data segments stored in the memory of node 208, the node 208 can communicate matching data segments to the iterator as the matching data segments may be located or found (e.g., during an iteration process) (step 222). For example, node 208 may be storing 10 data segments that match the search criteria. In this example, when the node 208 finds a first segment (e.g., segment 1) that matches the search criteria, the node 208 can communicate the segment 1 (including a key value pair) to the iterator and continue to search for the remaining 9 matching segments.

During the iteration process, the topology of the data grid may change. In one example, a topology change can be a transfer or relocation of data between nodes 206, 208, and/or 210 (e.g., a rebalancing of the data between the nodes). In another example, a topology change can be a change in a number of nodes in the data grid, e.g., nodes joining or leaving the data grid.

In one example, the topology of the data may be rebalanced to increase data locality. Data locality can be the locating or grouping of data segments at different nodes in the data grid based on usage or access of the data segments in the data grid. For example, when a data grid has consistent data-access patterns (such as accessing the same or similar data for query searches in a data grid), locating frequently accessed data segments at a same node and/or at a node in the data grid that is physically closest to a requesting user or an application can increase data locality. In another example, a data grid can use a consistent hashing function for key-value pair storage to enable the determination of data locality in the data grid. The coordinator in the data grid can use the consistent hashing function to determine where to locate or group data segments in the data grid to increase data locality. In one example, the coordinator in the data grid can communicate with nodes in the data grid and the nodes can communicate data access patterns or data usage to the coordinator. The coordinator can use the consistent hashing function to determine where to locate data segments at the different nodes based on the data access patterns or data usage. Additionally, the coordinator can use the consistent hashing function to sort the keys of the key value pairs and assign similar keys to related data to increase data locality by locating or grouping data segments with similar keys at the same node.

To rebalance the data at the nodes 206, 208, and/or 210, the coordinator can determine what data segments to locate at the different nodes 206, 208, and/or 210, such as by using the consistent hashing function as discussed in the preceding paragraphs (step 224). When the coordinator has determined what data to locate at the nodes 206, 208, and/or 210, the coordinator can send a rebalance command to one or more of the nodes 206, 208, and/or 210 indicating what data segments the nodes 206, 208, and/or 210 are to transfer to other nodes 206, 208, and/or 210, respectively, in the data grid (step 226). For example, the coordinator may determine that to increase data locality, selected data segments can be transferred from node 208 to node 210 (step 228) and other selected data segments can be transferred from node 210 to node 208 (step 230). In one example, the coordinator can unicast the rebalance command to the nodes 206, 208, and/or 210 in the data grid that are storing the data segments indicating the data segments to be transferred and the location to transfer the data segments. In another example, the coordinator can broadcast the rebalance command to the nodes 206, 208, and 210 in the data grid indicating the data segments to be transferred and the location to transfer the data segments. In this example, the nodes 206, 208, and 210 can receive the broadcasted rebalance command, and the nodes 206, 208, and 210 can determine when the nodes 206, 208, and 210 are storing the selected data segments. When the nodes 206, 208, and/or 210 determine that the nodes 206, 208, and/or 210 are storing the selected data segments, the nodes 206, 208, and/or 210 can transfer the data segments to the new location (e.g., another node in the data grid). In another example, when the data segments have been transferred by the nodes 206, 208, and/or 210, the nodes 206, 208, and/or 210 can send a copy of the data segments and maintain the original data at the nodes 206, 208, and/or 210.

In one example, when the transferred data segments are received at the nodes 206, 208, and/or 210, respectively, the initial nodes 206, 208, and/or 210 can receive a confirmation message from the receiving nodes 206, 208, and/or 210 and delete the data segments from the memories of the nodes 206, 208, and/or 210. In another example, when the nodes 206, 208, and/or 210 complete a transfer of data segments during a data rebalancing, the nodes 206, 208, and/or 210 can send a completion message to the coordinator indicating that the data segments have been transferred. In one example, when the rebalancing has been completed, the coordinator can send a deletion message to the nodes 206, 208, and/or 210 in the data grid indicating to the nodes 206, 208, and/or 210 to delete the data at the original nodes.

Additionally, the coordinator can send rebalance information to the iterator indicating that data segments have been transferred between nodes 208 and 210 (step 232). When the iterator receives the rebalance information, the iterator can determine what matching data segments have been received from node 208 and what data segments were not received from node 208 (step 234). In one example, a distributed data grid stores data in different segments on different nodes. For example, data stored in the data grid can be divided into 100 data segments and the 100 data segments can be stored at different nodes in the data grid. When nodes in the data grid receive a search request from the iterator, the nodes can send the requested data segments to the iterator.

Each of the data segments sent to the iterator can include information identifying the data segment, such as a key of a key value pair. The iterator can then determine which data segments have been received from the nodes based on the identifying information. For example, the node 208 may store data segments 1-10 and send segments 1-8 before segments 9 and 10 may be moved to the node 210 for rebalancing. When the iterator determines that data segments 1-8 have been received, then the iterator can send a request to the node 210 requesting data segments 9 and 10. When the iteration process begins, the iterator can use the data location information to determine which of the nodes 206, 208, and/or 210 are storing which data segments and how many data segments the iterator node should receive from each of the nodes 206, 208, and/or 210 during the iteration process. When the iterator receives less than an anticipated number of data segments from the nodes 206, 208, and/or 210, respectively, then the iterator can determine which of the other nodes the remaining data segments have been moved to in view of the anticipate versus the actual number of data segments received.

For example, the iterator can determine that the matching data segments that were not received from node 208 during the iteration process have been transferred to node 210. When the iterator has determined that the remaining matching data segments have been transferred to node 210, the iterator can send a selected data search command requesting that the node 210 search the data segments received from node 208 to find the remaining matching data segments (step 236). When the node 210 finds the remaining matching data segments, the node 210 can communicate the remaining matching data segments (e.g., rebalance data segments) to the iterator (step 238). In one example, when the iterator has received the search result data from the nodes in the data grid (such as values associated with the keys of a key value pair) the iterator can delete the keys in the memory of the iterator and communicate the values to the querying application 202. The iterator can determine the search result data using the data segments from node 208 and the rebalance data segments from node 210 (step 240). The iterator can communicate the search result data to the application 202 (step 242). An advantage of changing the topology of the data grid during the iteration process can be to increase the efficiency of the data grid, such as by increasing data locality at the nodes in the data grid.

Figure 3:
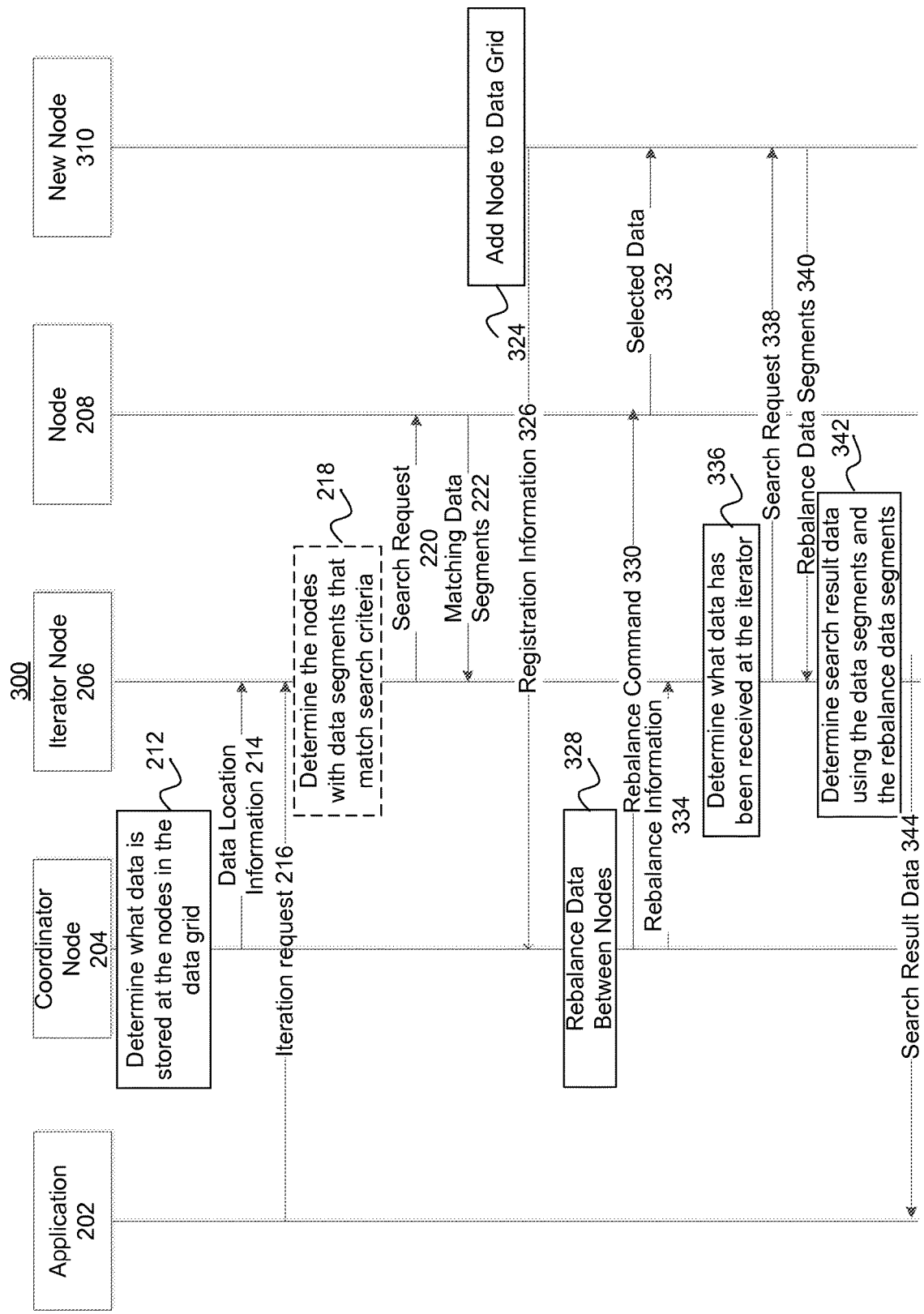
FIG. 3 depicts a sequence diagram of a method of performing a query in a data grid when the topology of the data grid may be changed according to one embodiment.

FIG. 3 depicts a sequence diagram of a method 300 of performing a query in a data grid when the topology of the data grid may be changed. Method 300 may be performed by a processing logic that may comprise hardware (e.g., circuitry, dedicated logic, programmable logic, microcode, etc.), software (such as operations being performed by the MCU), firmware or a combination thereof. In one example, method 300 is performed by a processor, a plurality of processors, a processor core, and/or a plurality of processor cores. Alternatively, other components of a computing system or software executing on the processor may perform some or all of the operations of the method 300.

Referring to FIG. 3, the method 300 is the same as the method discussed in the preceding paragraphs for FIG. 2 through the step of the node 208 communicating matching data segments to the iterator as the matching data segments are found (step 222). The topology of the data grid can change when a new node 310 is added to the data grid (step 324). In one example, when the memory of the data grid (e.g., the aggregate memory of the current nodes in the data grid) may be reaching full capacity, the new node 210 may join the data grid.

When the new node 310 may be added to the data grid, the new node 310 can communicate registration information to the coordinator (step 326). When the new node 310 has been added to the data grid, the coordinator can rebalance the data segments at the nodes 206, 208, and/or 310. To rebalance the data segments at the nodes 206, 208, and/or 310, the coordinator can determine what data segments to relocate at the nodes 206, 208, and/or 310 (step 328). When the coordinator has determined what data segments to relocate at the nodes 206, 208, and/or 310, the coordinator can send a rebalance command to one or more of the nodes 206, 208, and/or 310 indicating what data segments the nodes 206 and/or 208 are to transfer to the other nodes 206, 208, and/or 310, respectively (step 330). For example, the coordinator may determine that to avoid an out of memory (OOM) error in the data grid, such as when the memories of the nodes 206 and 208 reach full capacity and cannot receive additional data, selected data can be transferred from node 208 to node 310 (step 332). In another example, to avoid an OOM error, new data segments received at the data grid can be stored at the new node 310.

Additionally, the coordinator can send rebalance information to the iterator indicating that data segments have been transferred or rebalanced between nodes 208 and 310 (step 334). When the iterator has received the rebalance information, the iterator can determine what matching data segments have been received from node 208 and what data segments where not received from node 208 (step 336). The iterator can determine that matching data segments that were not received from the node 208 during the iteration process have been transferred to the new node 310. When the iterator has determined that the remaining matching data segments have been transferred to the new node 310, the iterator can send a selected data search command requesting that the new node 310 search the memory of the new node 310 to find the remaining matching data segments (step 338). When the new node 310 has found the remaining matching data segments, the new node 310 can communicate the remaining matching data segments (e.g., rebalance data segments) to the iterator (step 340). The iterator can determine the search result data using the data segments from node 208 and the rebalance data segments from the new node 310 (step 342). The iterator can communicate the search result data to the application 202 (step 344).

Traditionally, if a topology change occurs during the iteration process, it is uncertain what information was sent to the iterator prior to the rebalancing and all the data must be iterated through again (e.g., the iteration process may be restarted) to avoid duplicate data, out of order data, missing data and so forth. One advantage of changing the topology of the data grid (such as rebalancing the data segments) during the iteration process, as discussed in the preceding paragraphs, can be to increase the efficiency of the data grid by avoiding restarting of the iteration process each time there may be a topology change in the data grid. Another advantage of changing the topology of the data grid (such as rebalancing the data segments) during the iteration process can be to avoid OOM errors by adjusting the data capacity of the data grid during the iteration process.

As a query is performed in a data grid, the topology of the data grid can change when a node fails or crashes. A node may fail or crash for a variety of reasons, such as a disk failure or a process crash. To protect the data at the nodes in a data grid against a node failure, data may be backed up at one or more nodes in the data grid. When a node in the data grid crashes, backup data at one of the other nodes in the data grid can be used. Backup data of the failed node stored at other nodes in the data grid can be searched to compensate for the loss of the failed node.

In one example, the iterator can determine when a node has failed using heart beat messages. In this example, when a node is active and operational, the node can send heartbeat messages to the iterator indicating that the node is active and operational. When the node crashes, the iterator stops receiving the heartbeat messages. When the iterator determines that the node has crashed, the iterator can use the data location information to determine where backup data for the node is stored. The iterator can also determine what data segments were received from the node prior to the node crashing. When the iterator has identified a node with the backup data (e.g., the backup node), the iterator can send a search request to the backup node requesting the backup node send the remaining matching data segments.

In one example, the search criteria can include a filter and a converter that can be used at the nodes 204, 206, and/or 310 to reduce network chattiness and increase a performance of the data grid. The filter can represent an application installed at the nodes 206, 208, and 310 to match requested data criteria from the application 202 with a subset of a data segment at nodes 206, 208, and/or 310. For example, a data segment can include the names and ages of multiple people and the filter can select people with an age above 18 years old. The converter can represent an application to extract information from the subset of the data segments at the nodes 206, 208, and/or 310. For example, the converter can extract information from the subset (e.g., relevant bits) of the filtered data and pass the information to the iterator. For example, a search may be for names of people over 25. In this example, the filter can be used by a node to find information for the people over the age of 25 and the converter can send only the names of people selected by the filter, e.g., the converter can remove the age info from the filtered data before the data may be communicated to the iterator. One advantage of using the filter and the converter can be to reduce network traffic by enabling the nodes 204, 206, and/or 208 to communicate relevant data to the iterator. For example, an amount of data (such as data entries) sent to the iterator can be limited to the relevant data, e.g., the names of the people over 25 years old. In another example, the iterator can communicate a data format for nodes to communicate data to the iterator and the converter can convert a data format of result data to the data format communicated by the iterator. The data format communicated by the iterator can be a data format that is compatible with the iterator and/or the application 202.

Figure 4:
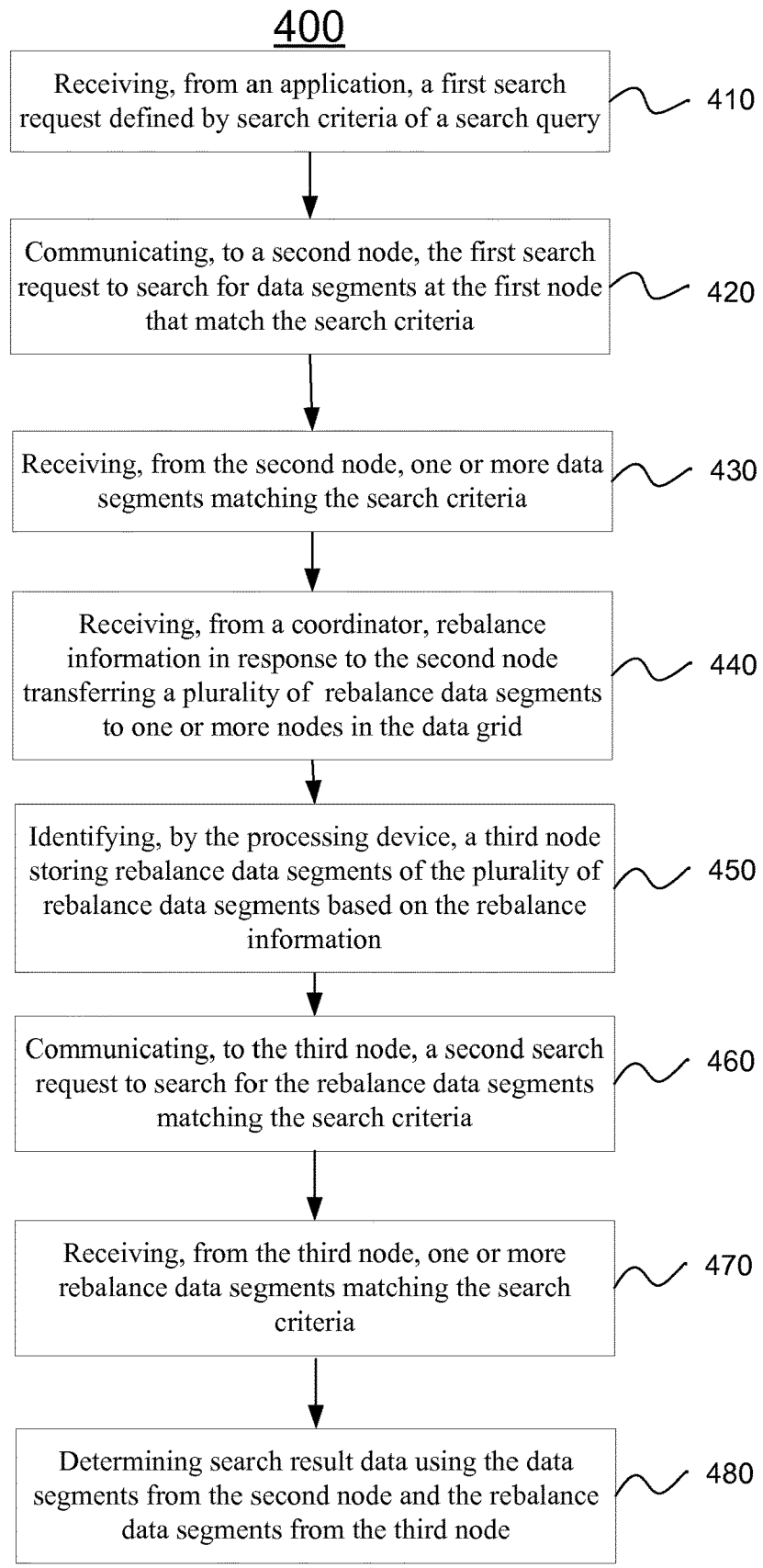
FIG. 4 depicts a flow diagram of a method of determining data results for a query search in a data grid according to one embodiment.

FIG. 4 is a flow diagram of a method 400 of determining data results for a query search in a data grid. Method 400 may be performed by processing logic that may comprise hardware (e.g., circuitry, dedicated logic, programmable logic, microcode, etc.), software (such as operations being performed by the MCU), firmware or a combination thereof. In one example, method 400 is performed by a processor, a plurality of processors, a processor core, and/or a plurality of processor cores. Alternatively, other components of a computing system or software executing on the processor may perform some or all of the operations of the method 400.

Referring to FIG. 4, the method 400 can begin by receiving, from an application, a first search request defined by search criteria of a search query (block 410). The method can include communicating, to a second node, the first search request to search for data segments at the second node that match the search criteria (block 420). The method can further include receiving, from the second node, one or more data segments matching the search criteria (block 430). The method can further include receiving, from a coordinator, rebalance information in response to the second node transferring a plurality of rebalance data segments to one or more nodes in the data grid, where the rebalance information identifies the one or more nodes storing the plurality of rebalance data segments (block 440). The method can further include identifying, by a processing device, a third node storing rebalance data segments of the plurality of rebalance data segments based on the rebalance information, where the rebalance data segments are data segments transferred from the second node to the third node that match the search criteria and are not part of the data segments received from the second node (block 450). The method can further include communicating to the third node a second search request to search for the rebalance data segments matching the search criteria (block 460). The method can further include receiving, from the third node, one or more rebalance data segments matching the search criteria (block 470). The method can further include determining search result data using the data segments from the second node and the rebalance data segments from the third node (block 480).

In one example, the method can include receiving, from a coordinator, data location information, wherein the data location information indicates where data is located at a plurality of nodes in the data grid and identifying, by the processor, a second node of the plurality of nodes storing data that matches the search criteria. In another example, the method can include communicating, to the application, the search results. In another example, the identify the third node can further include: identifying, by the processor, the data segments received from the second node matching the search criteria; determining, by the processor, data segments not received from the second node; and determining, by the processor, that the data segments not received are stored at the third node based on the rebalance information. In another example, the receiving, the communicating, the identifying, and the determining can occur during the search query. In another example, the first node, the second node, and the third node can be in a data grid. In another example, the rebalance data segments can be transferred from the second node to the third node when the third node joins the data grid during the search query.

Figure 5:
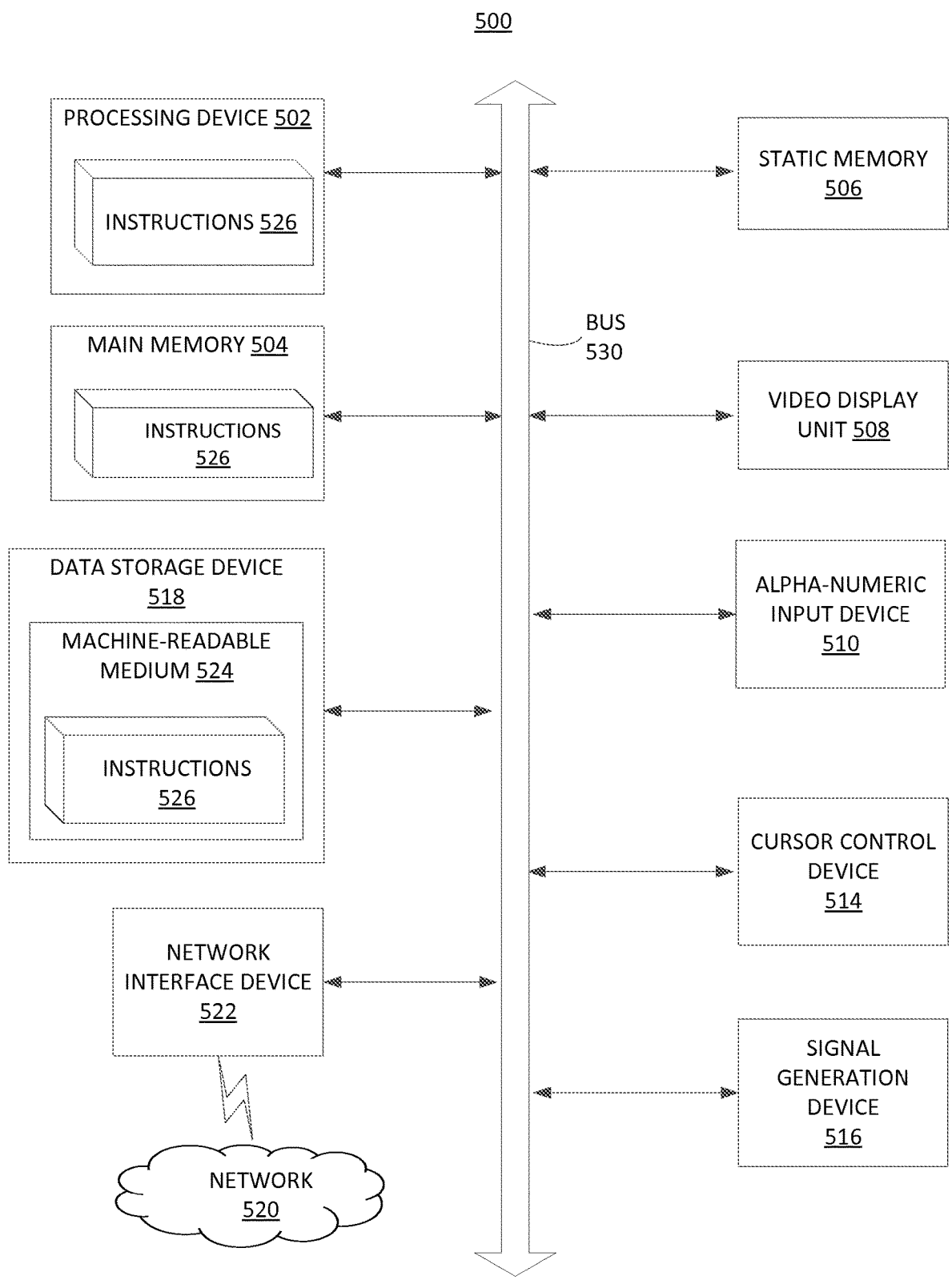
FIG. 5 illustrates a block diagram of one implementation of a computer system.

FIG. 5 illustrates a diagrammatic representation of a machine in the exemplary form of a computer system 500 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 522. The computer system 500 also may include a video display unit 508 (e.g., a liquid crystal display (LCD), a cathode ray tube (CRT), or a touch screen), an alphanumeric input device 510 (e.g., a keyboard), a cursor control device 514 (e.g., a mouse), and a signal generation device 516 (e.g., a speaker).

The data storage device 518 may include a machine-readable storage medium 524 on which is stored one or more sets of instructions 526 (e.g., software) embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting computer-readable storage media. The instructions 526 may further be transmitted or received over a network 520 via the network interface device 534.

While the machine-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A non-transitory machine-readable storage medium storing instructions which when executed cause a processing device to:
   receive, from an application, search criteria of a search query;
   determine that a plurality of data segments matching the search criteria of the search query are located at a first node;
   communicate, to the first node, a first search request to search for data segments matching the search criteria;
   receive, from the first node, a first data segment of the plurality of data segments matching the search criteria and located at the first node;
   receive an indication that a second data segment of the plurality of data segments matching the search criteria and previously located at the first node is no longer stored at the first node;
   receive an information indicating that the first node transferred the second data segment to a second node, wherein transferring the second data segment to the second node is subsequent to receiving the search criteria of the search query;
   communicate, responsive to receiving the information indicating the second node as a new location for the second data segment, a second search request to search for the data segments matching the search criteria of the search query;
   receive, from the second node, the second data segment;
   determine search result data of the search query, wherein the search result data comprises the first data segment received from the first node and the second data segment received from the second node; and
   send the search result data of the search query to the application.

2. The non-transitory machine-readable storage medium of claim 1, wherein the instructions further cause the processing device to receive data location information, wherein the data location information indicates where the search result data is located at a plurality of nodes.

3. The non-transitory machine-readable storage medium of claim 1, wherein the instructions to cause the processing device to send, to the application, the search result data are to be executed in response to determining the search result data of the search query.

4. The non-transitory machine-readable storage medium of claim 1, wherein the instructions to cause the processing device to communicate to the second node the second search request are to be executed in response to not receiving the second data segment from the first node.

5. The non-transitory machine-readable storage medium of claim 1, wherein the communicate and the determine the search result data occur during the search query.

6. The non-transitory machine-readable storage medium of claim 1, wherein the first node and the second node are in the data grid.

7. The non-transitory machine-readable storage medium of claim 6, wherein the second data segment is transferred from the first node to the second node when the second node joins the data grid.

8. A method comprising:
   receiving, from an application, search criteria of a search query;
   determining that a plurality of data segments matching the search criteria of the search query are located at a first node;
   communicating, to the first node, a first search request to search for data segments matching the search criteria;
   receiving, from the first node, a first data segment of the plurality of data segments matching the search criteria and located at the first node;
   receiving an indication that a second data segment of the plurality of data segments matching the search criteria and previously located at the first node is no longer stored at the first node;
   receive an information indicating that the first node transferred the second data segment to a second node, wherein transferring the second data segment to the second node is subsequent to receiving the search criteria of the search query;
   communicating, responsive to receiving the information indicating the second node as a new location for the second data segment, a second search request to search for the data segments matching the search criteria of the search query;
   receiving, from the second node, one or more rebalance data segments matching the search criteria;

determining search result data of the search query, wherein the search result data comprises the first data segment received from the first node and the second data segment received from the second node; and sending the search result data of the search query to the application.

9. The method of claim 8, further comprising receiving data location information, wherein the data location information indicates where the search result data is located at a plurality of nodes.

10. The method of claim 8, wherein sending the search result data of the search query to the application is responsive to determining the search result data of the search query.

11. The method of claim 8, wherein communicating to the second node the second search request is in response to not receiving the second data segment from the first node.

12. The method of claim 8, wherein the communicating and the determining the search result data occur during the search query.

13. The method of claim 8, wherein the first node and the second node are in the data grid.

14. The method of claim 13, wherein the second data segment is transferred from the first node to the second node when the second node joins the data grid.

15. A first node, comprising:
a memory to store data of the first node;
a processing device coupled to the memory; and
an iterator, executed from the memory by the processing device, to:
receive, from an application, search criteria of a search query;
determine that a plurality of data segments matching the search criteria of the search query are located at a second node;
communicate, to the second node, a first search request to search for data segments at the first node that match the search criteria;
receive, from the second node, a first data segment of the plurality of data segments matching the search criteria and located at the second node;
receive an indication that a second data segment of the plurality of data segments matching the search criteria and previously located at the second node is no longer available at the second node;
receive an information indicating that the second node transferred the second data segment to a third node, wherein transferring the second data segment to the third node is subsequent to receiving the search criteria of the search query;
communicate, responsive to receiving the information indicating the third node as a new location for the second data segment, a second search request to search for the data segments matching the search criteria of the search query;
receive, from the third node, the second data segment;
determine search result data of the search query, wherein the search result data comprises the first data segment received from the second node and the second data segment received from the third node; and
send the search result data of the search query to the application.

16. The first node of claim 15, the processing device further to receive data location information, wherein the data location information indicates where the search result data is located at a plurality of nodes.

17. The first node of claim 15, wherein the processing device is to send the search result data to the application in response to determining the search result data of the search query.

18. The first node of claim 15, wherein the processing device is to communicate to the third node the second search request in response to not receiving the second data segment from the second node.

19. The first node of claim 15, wherein the communicate and the determine the search result data occur during the search query.

20. The first node of claim 15, wherein the first node, the second node, and the third node are in the data grid.

* * * * *